(12) United States Patent
McLean et al.

(10) Patent No.: US 7,925,457 B2
(45) Date of Patent: Apr. 12, 2011

(54) FLOW METER AND AIRFLOW MEASUREMENT USING AN AIRFOIL

(75) Inventors: James Gordon McLean, Fuquay-Varina, NC (US); Keith Manders Campbell, Cary, NC (US); Raymond Todd Greggs, Raleigh, NC (US); Carloine Magdy Metry, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 12/247,569

(22) Filed: Oct. 8, 2008

(65) Prior Publication Data

US 2010/0088045 A1   Apr. 8, 2010

(51) Int. Cl.
*G01F 1/38* (2006.01)
*G06F 19/00* (2006.01)

(52) U.S. Cl. ............... 702/47; 702/33; 702/45; 702/55; 73/1.35; 73/861.23; 73/861.24; 73/861.25; 73/861.26; 73/196

(58) Field of Classification Search ................ 702/33, 702/45, 47, 55; 73/1.35, 861.23, 861.24, 73/861.25, 861.26, 196
See application file for complete search history.

(56) References Cited

U.S. PATENT DOCUMENTS

| | | | |
|---|---|---|---|
| 2,591,478 A * | 4/1952 | Turner, Jr. | ............... 73/861.351 |
| 4,154,101 A | 5/1979 | Buchanan et al. | |
| 4,561,309 A | 12/1985 | Rosner | |
| 4,931,776 A | 6/1990 | Klos et al. | |
| 4,945,771 A | 8/1990 | Ogden | |
| 5,121,658 A * | 6/1992 | Lew | ............... 73/195 |
| 6,701,781 B1 | 3/2004 | Lutowsky, Jr. et al. | |
| 6,966,231 B2 * | 11/2005 | Sheplak et al. | ............... 73/861 |
| 7,334,760 B1 * | 2/2008 | Lisy et al. | ............... 244/203 |

OTHER PUBLICATIONS

57:020 Mechanics of Fluid and Transfer Processes—Laboratory Experiment #3—"Measurement of Pressure Distribution and Lift for an Airfoil." Apr. 12, 2002.*
"LOUVER". Wikipedia, the free encyclopedia, http://en.wikipedia.rog/wiki/Louver, Aug. 8, 2008, 1 page.
louver, Definition from the Merriam-Webster Online Dictionary, http://www.merriam-webster.com/dictionary/louver, Aug. 8, 2006, 1 page.
Aeronautics learning Laboratory for Science, Technology, and Research, Allstar Network FIU. Wing Design—Conventional Airfoils and Laminar Flow Airflows, http://airstar.fiu.edu/aero/Wing31.htm, Jun. 5, 2008, 3 pages, Updated: May 2. 2008.

* cited by examiner

*Primary Examiner* — Sujoy K Kundu
(74) *Attorney, Agent, or Firm* — Cynthia G. Seal; Jeffrey L. Streets

(57) ABSTRACT

One embodiment provides a flow meter including an airfoil movably secured in the airflow path of a fan in an electronic system. The airfoil is configured to generate a lift component in response to the airflow. A sensor engages the airfoil and generates a signal in relation to the movement of the airfoil. Airflow parameters such as volumetric airflow rate and turbulence may be identified by an analysis of the movement of the airfoil.

19 Claims, 3 Drawing Sheets

FLOW METER AND AIRFLOW MEASUREMENT USING AN AIRFOIL

BACKGROUND OF THE INVENTION

1. Field of the Invention

The present invention relates to thermal management of an electronic system, and more specifically to monitoring and analyzing airflow parameters in a computer system.

2. Background of the Related Art

Advances in the power and performance of electronic systems have led to an increasing emphasis on thermal management and power management. In air-cooled electronic devices, it is useful to know the real-time thermal and cooling performance in terms of various airflow parameters. In computer systems, and particularly in servers, mechanisms have been added to monitor parameters such as temperature and fan speed at various locations. However, knowledge of fan speed and temperature provides a very limited understanding of the thermal and cooling performance of a server system. For example, fan speed does not even provide a reliable indication of airflow rate, because factors such as internal air paths, external blockages, and back pressure can affect the actual airflow rate independently of fan speed.

Instrumentation other than fan speed and temperature sensors has certain disadvantages. For example, airflow measurement subsystems incorporating pitot tubes can provide an accurate indication of airflow rate, but such subsystems are expensive relative to the overall cost of a computer system. Other devices used as airflow meters, can create excessive backpressure that reduces the cooling efficiency of the computer system. Such considerations have generally kept direct airflow measurement from being adopted in server systems.

BRIEF SUMMARY OF THE INVENTION

One embodiment of the present invention provides a flow meter, including an airfoil movably secured to a frame in the airflow path of a fan of an electronic system. The airfoil is configured to generate lift in response to the airflow. A sensor is configured to generate a signal in relation to the magnitude of the lift.

Another embodiment of the invention provides a method. Airflow is generated through an electronic system, and movement of an airfoil movably supported in the airflow is detected. A signal is generated in relation to the detected movement of the airfoil.

DETAILED DESCRIPTION OF THE INVENTION

One embodiment of the present invention is directed to the use of an airfoil movably mounted in the chassis of an electronic system to evaluate airflow parameters such as volumetric airflow rate and turbulence within the electronic system. The electronic system may be, for example, a computer system, an electronic audio/video entertainment system, an electronic overhead projector system, or other electronic system that has heat-generating components in a chassis and uses cooling fans to remove the generated heat. The airfoil generates lift in response to the airflow, a component of which is in a direction perpendicular to the direction of the airflow. The magnitude of the lift is in direct relation to the airflow rate. Movement of the airfoil, which may be detected, for example, by a strain gauge, or the amount of force or pressure applied by the airfoil to another body, such as pressure sensor, can provide an accurate and reliable indication of the airflow rate. Furthermore, fluctuations in airflow rate indicative of turbulence can be detected by corresponding fluctuations in the position of the airfoil or the amount of force or pressure applied by the airfoil. Evaluating turbulence can be useful in optimizing the efficiency of the electronic system's thermal behavior. For example, turbulent, airflow may indicate excessive backpressure, lack of clearance, or other airflow phenomenon affecting cooling efficiency that could not otherwise be ascertained using conventional systems and methods.

Another embodiment of the invention provides a flow meter including an airfoil movably secured in the airflow path of a fan in the electronic system, with the leading edge of the airfoil directed upstream. The airfoil is generates lift in response to the airflow. A sensor engages the airfoil to generate a signal in relation to the magnitude of the lift. The sensor may take various forms, such as a pressure sensor or a strain gauge. A pivotable airfoil preferably has a pivot axis that is perpendicular to the direction of airflow, and most preferably also horizontal.

Figure 1:
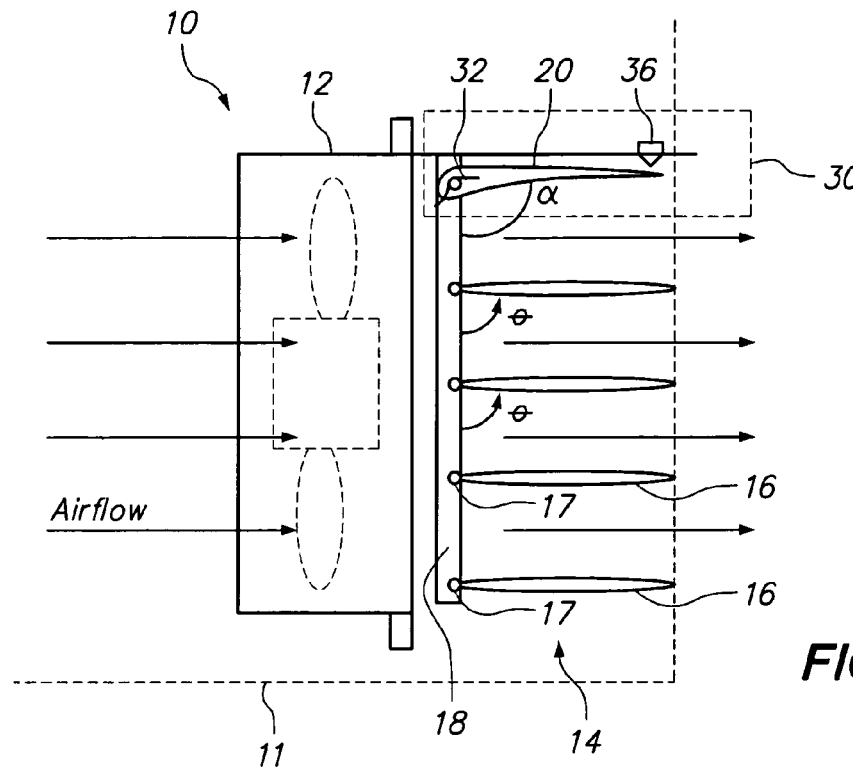
FIG. 1 is a schematic side view of a flow meter for measuring and analyzing airflow through an electronic system according to an embodiment of the invention.

FIG. 1 is a schematic side view of an electronic subsystem 10, including a flow meter 30 for measuring and analyzing airflow through an electronic system. The electronic system may be, for example, a computer system, an audio/video system, or a projector. A chassis 11 encloses components of the electronic subsystem 10 and provides a structural framework for mounting the components. A cooling fan 12 generates airflow through the chassis 11 to cool heat-generating components in the chassis 11. The airflow passes over a pivoting airfoil 20 secured to a structural member referred to here as a frame 18, before exiting the chassis 11. An optional louver 14, shown here including four slats 16, is also provided at the rear of the chassis 11. The louver 14 is not limited to a particular number of slats. The airfoil 20 may have about the same length and thickness as each slat 16 (FIG. 1), and may be included with the optional louver 14 as a sub-assembly mounted to the chassis 11. The flow meter 30 for measuring airflow parameters includes the airfoil 20, along with a strain gauge 32 and a pressure transducer 36 for sensing movement of the airfoil 20. The strain gauge 32 and pressure transducer 36 are shown in the figures as two examples of sensors, although only one sensor may be included.

The slats 16 are open in FIG. 1 to allow airflow through the louver 14. It is generally desirable to minimize any airflow resistance created by the slats 16 and to maximize airflow through the louver 14 by maintaining the slats 16 in the horizontal position shown (θ=90 degrees) while airflow is being generated by the fan 12. One option for maintaining the slats 16 in the horizontal, open position shown is to fix the slats 16 to the frame 18 in that position. Another option is for the angle (θ) of each slat 16 to be user-adjustable, such as to control the airflow rate through the chassis 11, or to alter the direction of airflow exiting the louver 14. A preferred option in the embodiment of FIG. 1, however, is for each slat 16 to be freely movable about a pivot 17 that secures each slat 16 to the frame 18. The slats 16 may be moved to the open position in response to the airflow generated by the fan 12, and biased to a closed position using gravity and/or light spring tension to move the slats 16 to the closed position when the fan 12 is not moving. The slats 16 also have a symmetrical, narrow cross-sectional shape to minimize resistance to airflow through the louver 14.

Even when open, the slats 16 provide some protection against physical damage to components of the electronic system, as well as reduce the amount of dust that may settle on a circuit board (not shown) or other sensitive electronic components that may be below the louver 14. When closed, the slats 16 provide further protection against the intrusion of dust and other foreign objects into the chassis 11. Biasing or manually moving the slats to the closed position may also maintain system airflow integrity in instances where, for example, the particular fan 12 is not installed or is temporarily disabled or broken. For example, biasing or manually positioning the slats 16 in the closed position may prevent an appreciable amount of airflow from escaping through the louver 14, so that one or more other fans can move air through the chassis 11 along an alternate airflow path, such as through another louver (not shown) located elsewhere on the chassis 11.

Figure 2:
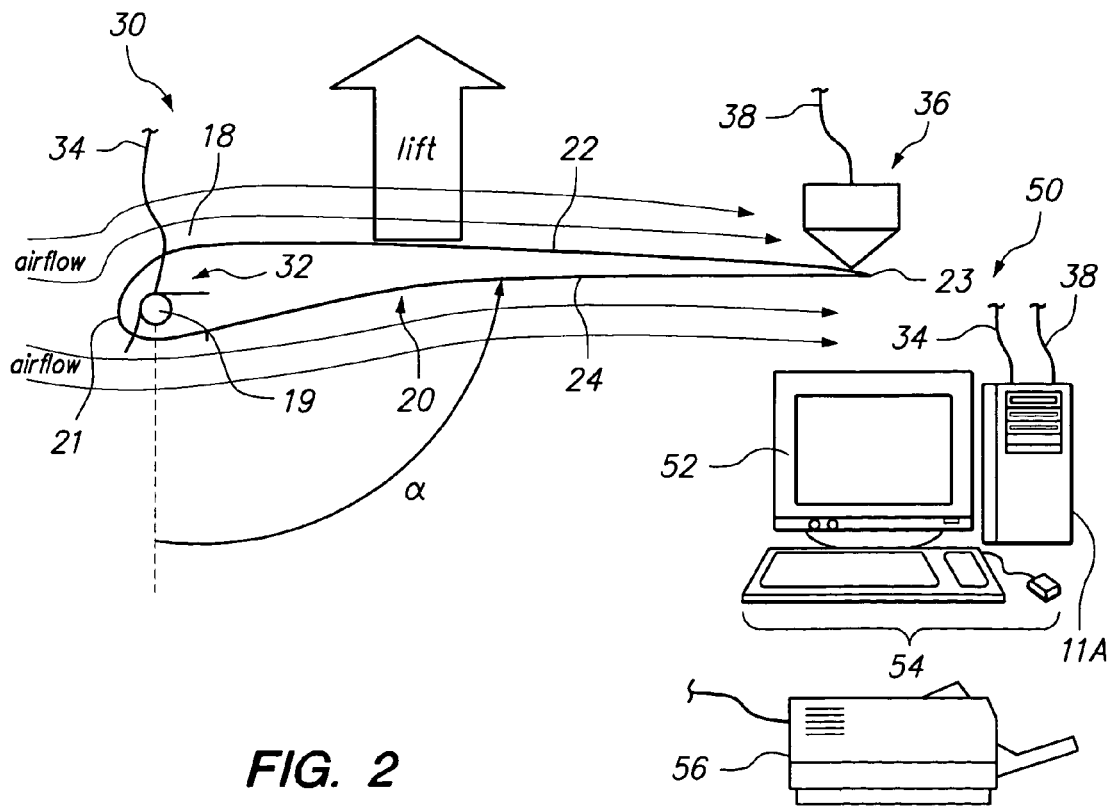
FIG. 2 is a schematic side view of the flow meter in communication with a data processing system for acquiring and analyzing data from the flow meter.

FIG. 2 is a side view of the flow meter 30 in communication with a data processing system 50 for acquiring and analyzing data from the flow meter 30. An enlarged view of the airfoil 20 is shown. The airfoil 20 is pivotably secured to the frame 18 by a pivot 19. A low-friction pivot is desirable so that the airfoil 20 freely pivots in response to the airflow. In contrast to the symmetrically-shaped slats 16 (see FIG. 1), the airfoil 20 generates a lift component in response to the airflow about the airfoil 20. In particular, the distance along an upper surface 22 of the airfoil 20, between a leading edge 21 and trailing edge 23, is longer than the distance along a lower surface 24. Airflow passing over the airfoil 20 from the leading edge 21 to the trailing edge 23 must therefore travel faster than airflow passing under the airfoil 20 from the leading edge 21 to the trailing edge 23, which, according to the principles of fluid dynamics, causes airflow on the tipper surface 22 to be at a lower pressure than airflow on the lower surface 24. The pressure differential results in lift, a component of which is perpendicular to the direction of airflow. This lift creates a moment about the pivot 19, which urges the airfoil 20 about the pivot 19 (in a counter-clockwise direction in FIG. 2), resulting in an upward movement of the trailing edge 23 of the airfoil 20 opposite the pivot 19.

Any of a variety of types of sensors may be used to sense the lift imparted to the airfoil 20, and the strain gauge 32 and pressure transducer 36 are merely two different examples. Also, though more than one sensor may be included and two sensors 32, 36 are shown, such as for redundancy, a single sensor is generally sufficient. The strain gauge 32 senses movement of the airfoil 20 caused by the lift, such as by sensing the angular displacement resulting from the airfoil 20 moving about the pivot 19. The strain gauge 32 generates a signal in relation to the angular displacement caused by the lift, and communicates that signal to the data processing system 50 along signal line 34. Conversely, the pressure transducer 36 generates a signal in relation to the magnitude of the force imparted to the pressure transducer by the airfoil 20 in response to the magnitude of the lift and communicates that signal to the data processing system 50 along signal line 38. The airfoil may still move in relation to the magnitude of the lift when engaged with the optional pressure transducer 36, although the amount of movement may be imperceptible to the human eye. The pressure transducer 36 may be spaced a selected radial distance from the pivot 19. While signal lines 34, 38 are shown by way of example, the signals may be conveyed by other signal communication technology, such as electronic signals carried by electronically conducting wires, optical signals carried by fiber optic cables, and/or electromagnetic signals transmitted wirelessly from a transmitter to a receiver.

While the airfoil 20 in this embodiment is movably secured to the frame 18 about a pivot 19 having a fixed pivot axis, it should be recognized that alternative ways of movably securing the airfoil 20 to the frame 18 are also within the scope of the invention. For example, in another embodiment, the airfoil 20 may be movably secured to the frame 18 on a track, such as an inclined, arcuate or linear track, such that the airfoil 20 may move by sliding or a combination of sliding or pivoting. The movement of the airfoil 20 in such an embodiment may still be sensed and correlated with airflow parameters as described herein.

Referring again to FIG. 2, the data processing system 50 includes a chassis 11A having processors, memory, and other computer components, along with software for acquiring and processing the data from the sensors 32, 36. The data processing system 50 optionally includes a display 52, input/output peripherals such as a mouse and keyboard 54, and a printer 56. In one embodiment, the electronic system includes hardware or firmware contained on the electronic system being cooled. For example, the electronic system being cooled may be a computer system, and the data processing system 50 may be the computer system being cooled, in which case the chassis 11A may be the chassis 11 of the computer system being cooled. In another embodiment, the data processing system 50 may be a remote computer for remotely monitoring the electronic system of FIG. 1. For example, the electronic system of FIG. 1 may be a server, and the data processing system 50 may be a workstation for monitoring the server over a network.

Airflow-related parameters, such as volumetric airflow rate, may be correlated with movement of the airfoil 20. For example, the angular displacement ($\alpha$) of the airfoil 20, as sensed by the strain gauge 32, is directly related to the amount of lift generated. Similarly, the force or pressure exerted by the airfoil 20 against the pressure transducer 36 is directly related to the amount of lift generated. In turn, the magnitude of the lift is directly related to the velocity of the airflow over the airfoil 20. Therefore, a correlation may be obtained between the volumetric airflow rate and movement of the airfoil 20, such as in terms of the angular displacement $\alpha$ of the airfoil 20 or in terms of the force or pressure exerted by the airfoil 20 against the pressure transducer 36.

Figure 3:
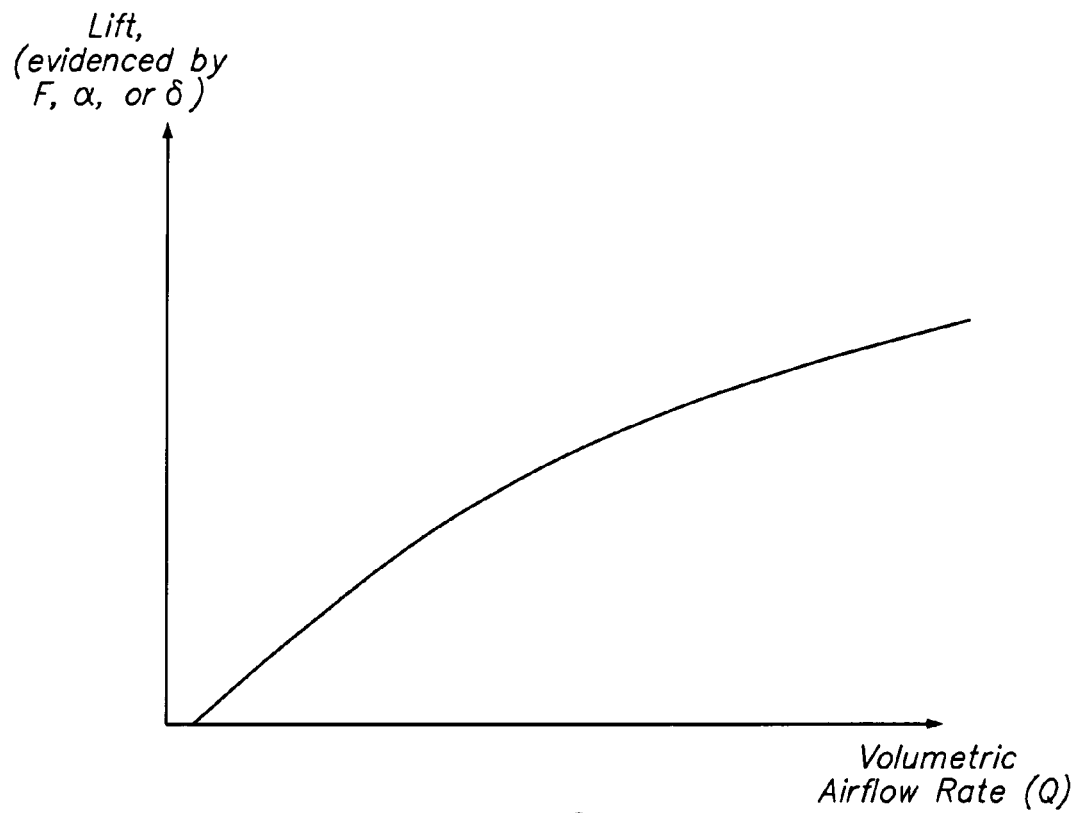
FIG. 3 is a graph providing an exemplary correlation between volumetric airflow rate and movement of the airfoil included in the flow meter.

FIG. 3 is a graph providing an exemplary correlation between the magnitude of the lift component perpendicular to the airfoil 20 and the volumetric airflow rate. The actual shape of the curve may vary depending on the geometry of the airfoil, the type of sensor used, and so forth. The general relationship described by the curve is that the indicia of lift—e.g. force, pressure, angular displacement $\alpha$, or linear displacement $\delta$ of a point on the airfoil 20 spaced from the pivot—will generally increase with increasing volumetric airflow rate. Such a correlation can be determined for a particular system configuration. Typically, the correlation will be empirically obtained for a target electronic system, such as for a particular chassis configuration, by using an accurate airflow measurement device in the vicinity of the airflow and obtaining data such as the movement of the airfoil to the velocity or volumetric flow rate of air through the target electronic system. For example, numerous measurements of the airflow rate and the corresponding displacement or force of the airfoil against a pressure transducer may be obtained, and stored in memory for access by the data processing system 50. When the target electronic system is subsequently in service, the sensed parameter such as movement of the airfoil or the force or pressure imparted by the airfoil to a sensor may be cross-referenced with the stored correlation to obtain a value of the dynamic airflow rate. The obtained value of the airflow rate may then be output, such as to the display 52 or to the printer 56 of the data processing system in FIG. 2. If the indicated airflow rate reaches a setpoint, such as an upper threshold or a lower threshold, an alert may be generated. For example, an alarm may be generated if the movement of the airfoil 20 indicates the airflow is insufficient to cool the electronic system.

The analysis may be extended to other airflow-related parameters, and in particular to turbulence. Excessive turbulence may be the result of problems, such as backpressure, lack of clearance, or other airflow phenomenon affecting cooling efficiency, so being able to identify turbulence by movement of the airfoil is useful. Turbulence may be correlated with fluctuations of movement of the airfoil.

Figure 4:
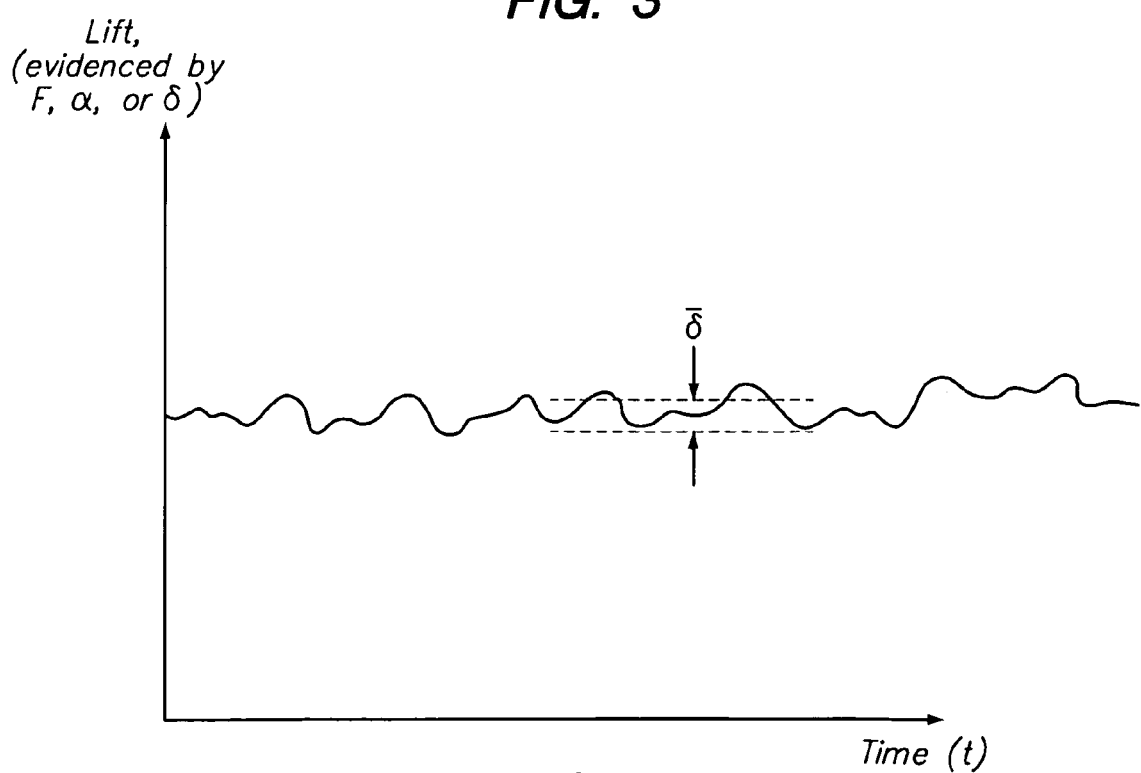
FIG. 4 is a graph representing the hypothetical fluctuation in movement of an airfoil over time.

FIG. 4 is a graph indicating a hypothetical fluctuation in lift over time. The fluctuation in lift may be evidenced, for example, by movement of an airfoil or force or pressure applied by the airfoil over time. A variety of indicia may be selected to assess the fluctuation. If movement is being sensed by a strain gauge, the fluctuation may be evidenced as a fluctuation in position. If force or pressure is being sensed by a pressure transducer, the fluctuation may be evidenced by a fluctuation in force or pressure applied by the airfoil to the pressure transducer. In the graph, the mean displacement is labeled by way of example as an indication of the magnitude of the fluctuation, although other indicia or combination of indicia may be selected, such as the deviation from the mean displacement or the frequency of fluctuation.

The Reynolds number is sometimes used as an indicator of different flow regimes, including turbulent flow. The fluctuation of an airfoil may be empirically correlated with the Reynolds number as an indicator of the degree of turbulence. However, the correlation does not require computing the Reynolds number. Rather, in one embodiment, the correlation may involve identifying an acceptable upper limit on the degree of turbulence, as evidenced by the selected indicia, and setting the corresponding value of the selected indicia as an upper threshold or setpoint. Then, when the target system is in service, whenever the fluctuation of the airfoil reaches the setpoint, an alert may be generated indicating turbulence.

Figure 5:
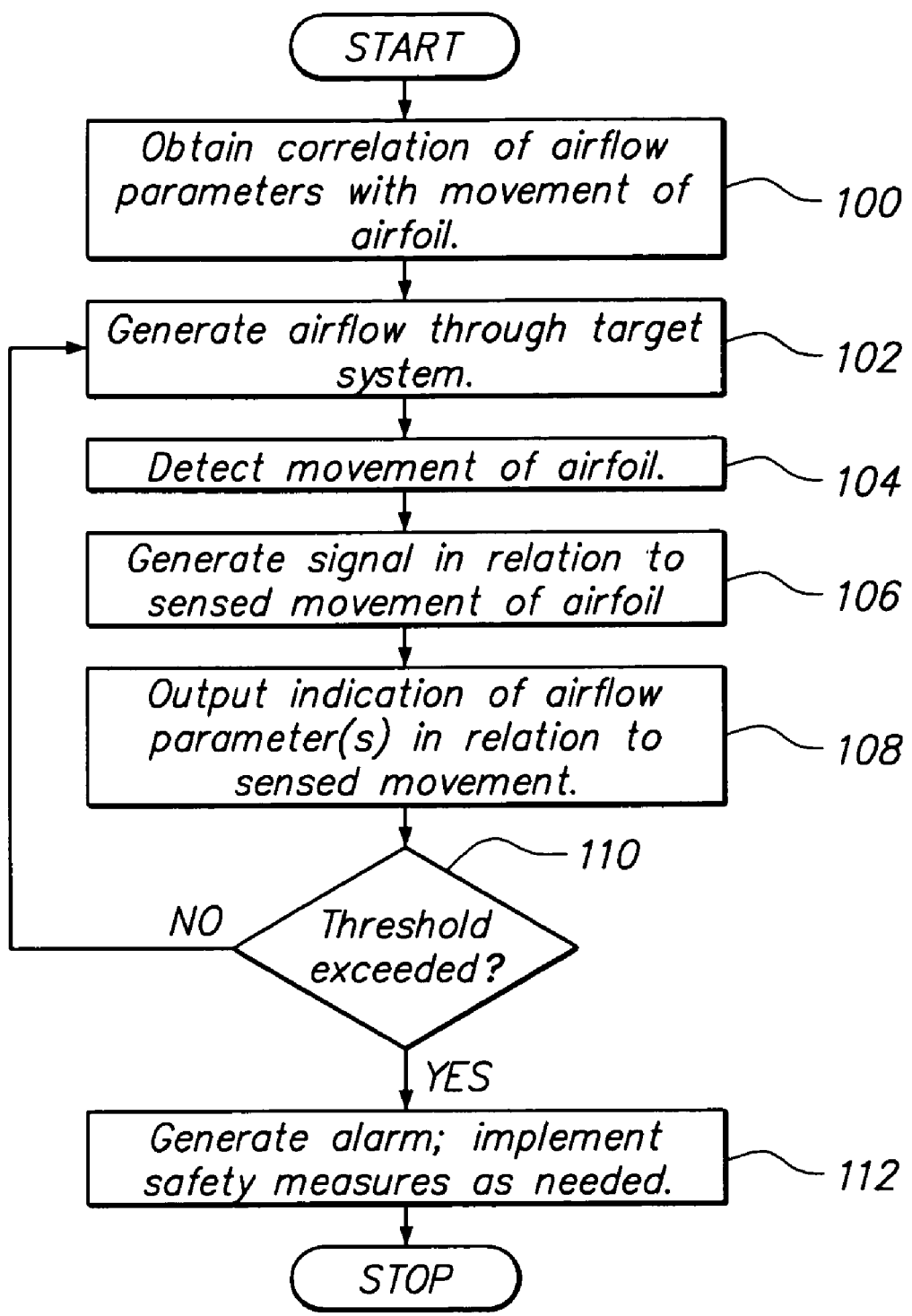
FIG. 5 is a flowchart outlining a method according to an embodiment of the invention.

FIG. 5 is a flowchart outlining a method according to an embodiment of the invention. While the description of the outline generally summarizes the steps of the method, additional details regarding the individual steps may be informed by reference to the preceding discussion of system and figures. In step 100, a correlation is obtained between volumetric airflow rate and lift component perpendicular to a movably mounted airfoil in a target electronic system. In step 102, airflow is generated through the target system by forced convection, such as by using one or more fans to blow air through a system chassis. The airflow is directed over the airfoil to generate lift. In step 104, a lifting force or movement of the airfoil is detected and, in step 106, a signal is generated in relation to the lifting force produced by the airfoil. For example, the generated signal may be representative of the displacement of the airfoil or the force of the airfoil against a pressure transducer. If the volumetric airflow rate or turbulence, reaches a setpoint, then the signal may include an alert, or a separate alert signal may be generated. In step 108, an indication of the airflow parameters and the sensed movement is output. For example, a graphical indication (e.g. a graph or table) of the volumetric airflow rate or degree of turbulence may be displayed on a display screen or printed using a printer. If an upper threshold is exceeded, as determined in conditional step 110, the alarm may be generated in step 112, such as to indicate an abnormally low volumetric airflow rate or an unsafe degree of turbulence. Safety measures may be implemented as needed, such as to shutdown the target system automatically or enter a reduced-power mode of operation.

Although fan speed may not be a reliable indicator of the volumetric airflow rate within a chassis of an electronic system, the fan speed is usually known to the fan controller and one or more controllers can be used to compare the actual airflow rate measured by the instrument of the present invention with the airflow rate that is expected as a function of the fan speed and the physical configuration of the chassis. Improper installation of new components within the chassis or blockage of inlet or exhaust ports of the chassis will cause a substantial deviation between the actual and expected airflow rate. Such a comparison may be beneficial to avoid false "low airflow" alerts, for example as result of a power management controller causing the processors and fan motors to throttle or shutdown.

It should also be recognized that an electronic system chassis may include one more instruments of the present invention. For example, it may be beneficial to measure the airflow rate through more than one pathway through the chassis or measure the airflow rate caused by one or more individual fans. In a chassis having multiple, individually controllable fans, using multiple instruments makes it possible to determine the most efficient combination of fans and fan speeds to achieve a desired airflow rate. Furthermore, the use of multiple instruments makes it possible to measure air flow gradients, such as a group of instruments positioned across a chassis exhaust port measuring the airflow rate at each of the different positions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In embodiments of the invention described with reference to flowchart illustrations, it will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A flow meter, comprising:
an airfoil movably secured to a frame in the airflow path of a fan in an electronic system, the airfoil being configured to generate lift in response to the airflow; and
a sensor that engages the airfoil and generates a signal in relation to the magnitude of the lift.

2. The flow meter of claim 1, further comprising:
a pivot that pivotably secures the airfoil to the frame, wherein the pivot defines a pivot axis that is perpendicular to the direction of the airflow path.

3. The flow meter of claim 1, wherein the sensor includes a strain gauge that senses displacement of the airfoil in response to the lift and generates the signal in relation to the displacement.

4. The flow meter of claim 1, wherein the sensor includes a pressure transducer that senses a force or pressure exerted by the airfoil against the pressure transducer in response to the lift and generates the signal in relation to the force or pressure.

5. The flow meter of claim 1, further comprising:
a data processing system operatively coupled to the sensor and configured to receive the signal and output a graphical representation of the signal.

6. The flow meter of claim 5, wherein the data processing system computes and outputs a representation of the airflow rate in relation to the signal.

7. The flow meter of claim 5, wherein the data processing system detects fluctuations in the magnitude of the lift and outputs a representation of turbulence in relation to the signal.

8. The flow meter of claim 2, wherein the pivot axis is horizontal.

9. A method of measuring an airflow rate, comprising:
generating airflow through an electronic system;
passing the airflow over an airfoil movably secured within the electronic system to generate lift and move the airfoil in relation to the amount of lift; and
sensing the movement of the airfoil and generating a signal in relation to the movement.

10. The method of claim 9, further comprising:
sensing an angular displacement of the airfoil about a pivot in response to the lift; and
generating the signal in relation to the sensed angular displacement of the airfoil.

11. The method of claim 10, further comprising:
identifying when the sensed angular displacement reaches a setpoint and outputting an alert in response to reaching the setpoint.

12. The method of claim 9, further comprising:
sensing a force or pressure exerted by the airfoil against another body in response to the lift; and
generating the signal in relation to the sensed force or pressure exerted by the airfoil.

13. The method of claim 12, further comprising:
identifying when the sensed force or pressure reaches a setpoint and outputting an alert in response to reaching the setpoint.

14. The method of claim 9, further comprising:
outputting a graphical representation of the signal.

15. The method of claim 9, further comprising:
determining a volumetric airflow rate in relation to the magnitude of the lift indicated by the signal.

16. The method of claim 9, further comprising:
identifying fluctuations in the magnitude of the lift indicated by the signal; and
outputting a representation of turbulence in response to the fluctuations.

17. The method of claim 16, further comprising:
outputting an alert in response to the magnitude of the fluctuations reaching a setpoint.

18. The method of claim 9, wherein the electronic system is a computer system.

19. The method of claim 9, wherein the electronic system is selected from an audio system, video system, or combination thereof.

* * * * *

UNITED STATES PATENT AND TRADEMARK OFFICE
CERTIFICATE OF CORRECTION

PATENT NO. : 7,925,457 B2  Page 1 of 1
APPLICATION NO. : 12/247569
DATED : April 12, 2011
INVENTOR(S) : James Gordon McLean et al.

It is certified that error appears in the above-identified patent and that said Letters Patent is hereby corrected as shown below:

On the title page, item (75) naming the Inventors, the name "Carloine Magdy Metry" should read --Caroline Magdy Metry--.

Signed and Sealed this
Fifth Day of March, 2013

Teresa Stanek Rea
*Acting Director of the United States Patent and Trademark Office*